Jan. 20, 1970  F. MELCHIORRE  3,490,315
TOOL FOR WIDENING AND PRECISION FINISHING
THROUGH BORES AND DEAD BORES
Filed June 15, 1967
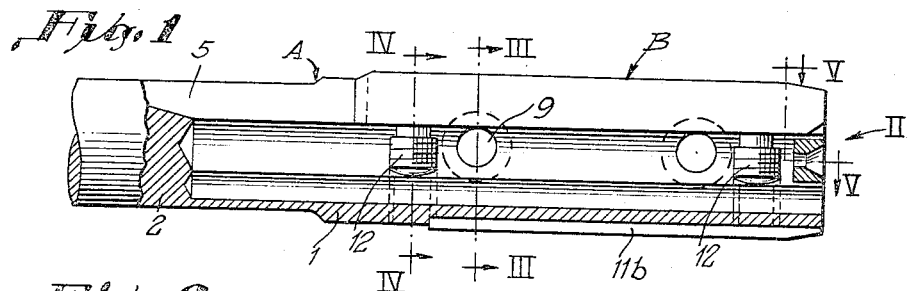
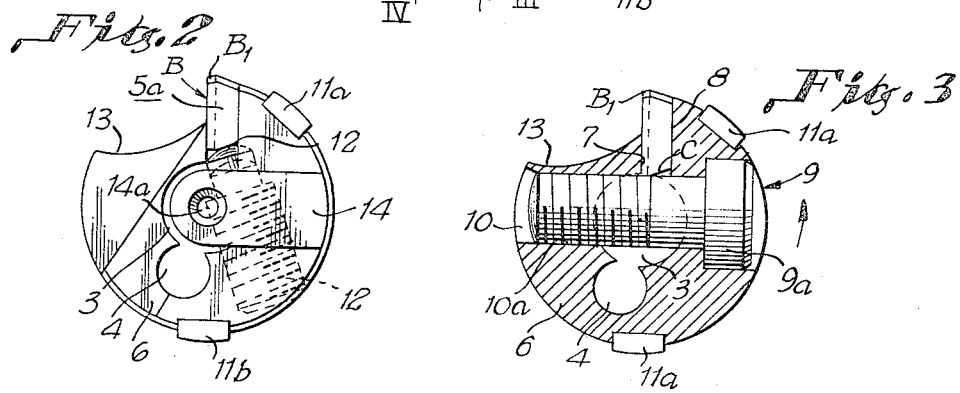
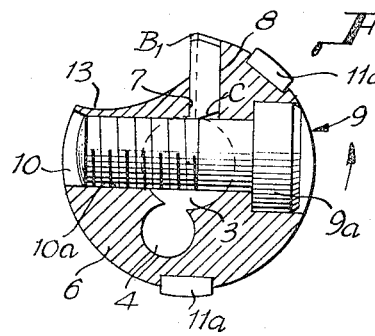
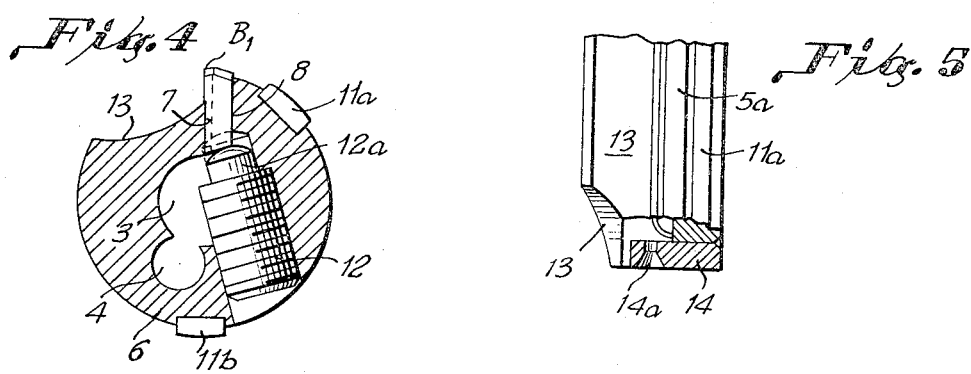
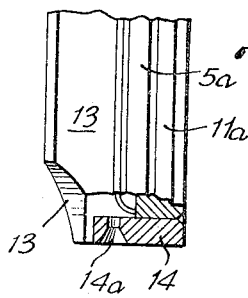
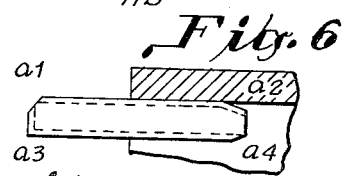
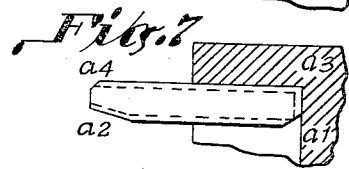
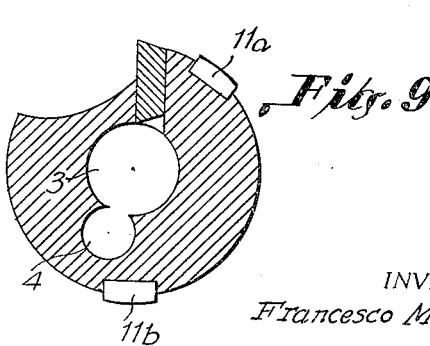
INVENTOR.
Francesco Melchiorre

United States Patent Office 3,490,315
Patented Jan. 20, 1970

3,490,315
TOOL FOR WIDENING AND PRECISION FINISHING THROUGH BORES AND DEAD BORES
Francesco Melchiorre, Viale Piemonte 9,
Cinisello Balsamo, Milan, Italy
Filed June 15, 1967, Ser. No. 646,237
Claims priority, application Italy, July 2, 1966,
19,765/66
Int. Cl. B23b *51/00;* B23d *77/00*
U.S. Cl. 77—75               5 Claims

ABSTRACT OF THE DISCLOSURE

A tool used for widening and precision finishing bores and dead bores has a cylindrical body carrying the working blade. The tool body has two longitudinal bores and a longitudinal prismatic slot for the blade. One of the bores is coaxial with the tool body and it communicates with the other bore along a narrow passage. The slot communicates with one of the bores and extends to the outer surface of the tool body. The two bores and the slot actually divide the tool body into two portions which are joined by a narrow strip.

---

The object of this invention is a tool for widening and precision finishing both through bores and dead bores.

Various types of tools are presently known adapted for reaming bores but in all of them there are constructional and operational difficulties which have not yet been overcome.

In fact all the reaming tools presently available have their cutting blade integral with the tool that is permanently attached to the tool body; said blade being usually made of hard material such as a metal carbide.

The following is a list of the main drawbacks of such a construction:

The radial distance of the cutting edge of the blade with respect to the tool axis cannot be generally varied; in some types of reamers only, such as the expansion reamers such distance can be modified within a very limited range. Due to this drawback, a reamer of a given size can be used for reaming bores of the same size only.

The life of the tool is short in as much as the wear of the cutting edge beyond the limit of the allowed tolerance prevents any further use of the tool.

The re-sharpening of the cutting edge is awkward just because the blade is integral with the tool.

Due to the welding of the blade to the tool its cutting effectiveness is partially spoiled and its life shortened due to the partial loss of the metallurgical characteristics obtained through the hardening process.

To the above the disadvantage is to be added that with the same tool the reaming of through bores only or the reaming of dead bores only can be accomplished but never both types of work.

It is therefore a major object of this invention to obviate the above mentioned disadvantages and inconveniences by providing a reaming tool of simple construction and rational operation which is adapted both for reaming through bores that is for peripheral reaming and for reaming dead bores that is for end reaming.

This and other objects are achieved by means of the reaming tool of the present invention which is essentially characterized by the fact that its body is provided with means whereby the cutting blade is removably attached to the tool and with means whereby the distance of the cutting edge from the tool axis can be adjusted with the utmost accuracy at the proper value for obtaining the required working diameter of the tool; said blade being adapted for accomplishing the reaming of both through bores and dead bores this being achieved through different positioning of the blade on the tool body.

In order to ensure the fastening of the blade to the tool body, the latter is provided with two bores parallel to its axis of which one is coaxial with the tool body and the other slightly smaller is substantially tangential to the former; in a position almost diametrically opposed to the smaller bore there is a prismatic slot for receiving the blade therein which slot communicates with the inner spaces of the two bores. The purpose of the two bores is to render the tool body elastic so that the width of the slot can be varied under the action of a force applied to the sides of the body transversely with respect to the body axis whereby the blade when inserted into the slot can be clamped between the slot surfaces which face each other all along the blade length; one or more screws being used for applying said force to clamp the blade.

This, according to the invention, is so shaped that it can be used for reaming a peripheral surface or a front surface the two working positions being obtained by rotating the blade through an angle of 180° about an axis perpendicular to the blade plane.

The invention will be described with greater details with reference to an embodiment thereof which is given by way of example and which is illustrated in the attached drawing where:

FIG. 1 shows an axial section of the tool;

FIGS. 2, 3 and 4 show in a larger scale, respectively a front view in the direction of arrow II of FIG. 1; a section along line III—III of FIG. 1 which illustrates the means for clamping the blade; and a section along line IV—IV of FIG. 1 which illustrates the means for adjusting the distance of the cutting edge of the blade with respect to the tool axis.

FIG. 5 shows the end of the tool which is partially sectioned along line V—V of FIG. 1.

FIG. 6 shows the blade isolated from the rest of the tool and introduced into the workpiece to be reamed in its position for reaming a through bore.

FIG. 7 shows the blade inserted into the workpiece to be reamed in its position for reaming a dead bore. As in FIG. 6 the rest of the tool is not shown for better clarity.

FIG. 8 shows the same blade of FIG. 7 which blade has been rotated through an angle of 90 deg., with respect to its position in FIG. 7. The workpiece is not shown for better clarity.

FIG. 9 is an end view of a blade for an end reaming as in FIGS. 7 and 8.

With reference to the drawing, with A the body of the reaming tool is indicated and with B the blade associated thereto.

Said body A is cylindrical its diameter being larger all along the front section 1 and smaller along the tang 2; lengthwise of the tool two bores are provided in the tool body of which bores a first one is coaxial with the tool and a second one much smaller is parallel and tangentially communicating with the former; both bores extend from the front end of the tool all along the front section 1 and for a length into the tang section 2.

In a position almost diametrically opposed to the bore 4 with respect to the tool longitudinal axis a slot 5 is provided in the tool body whereby the central bore 4 communicates with the outside of the tool body. Slot 5 is defined by two surfaces parallel to each other one of which lies substantially on the same plane as the tool axis and extends along almost the whole length of the front section 1 of the tool.

From the drawing it appears that the tool body is divided along the whole length of slot 5 in two portions which are connected only through section 6; and this because bore 4, bore 3 and slot 5 communicate with each other and with the outside of the tool through slot 5. Due to the elastic properties of the material of the tool body the transverse size 5a of slot 5 can be resiliently varied so that the blade B can be clamped between the surfaces 7 and 8 of the slot 5 when a force is applied which tends to approach said portions of the body one towards the other. Such a force is applied by means of the tightening screws 9 which are received into diametral bores 10 of the body which are almost perpendicular to the line along which the bores 3 and 4 and the slot 5 are disposed. The screws 9 with their threaded portion engage the threaded portion 10a of bore 10 while their heads abut against the bottom of the counterboring of the same bore; by tightening the screws 9 the blade B is clamped between the surfaces 7 and 8. Such a clamping action is positive and ensures also a perfect operation of the tool. For achieving the most accurate operation of the tool this is provided with two rodlike pads 11a and 11b made of very hard material such as tungsten carbide which are disposed along two generatrices and project from the cylindrical body the same amount exactly as the cutting edge B1 of the blade.

Pad 11a follows the blade B in the direction of the working tool at an angular distance which depends on the size of the bore to be reamed; pad 11a supports the blade at the rear preventing the cutting edge from being deflected out of the plane of the blade and from vibrating, the latter being a dangerous condition and liable to spoil the work of the tool. Pad 11b is located at a position diametrically opposed to the blade B, and precisely to the edge B1 of the blade; by pad 11b the most accurate dimension of the bore to be reamed is achieved and the blade is prevented from being deflected in the plane containing the edge B1 and the tool axis.

According to another embodiment, not less important of the invention, a device is provided by which the position of cutting edge B1 that is its distance from the axis of rotation can be adjusted. To this purpose a pair of transverse screws 12 are provided of which the axis is made as far as possible to lie on the median plane of slot 5 so that the ends 12a of said screws 12 abut against the edge of the blade B opposite to the cutting edge B1 and by acting on said screws the blade is forced outwards of the tool; in this way the required position of the cutting edge B1 is achieved.

More particularly, when after wearing and sharpening, the height of the blade is substantially reduced the worn out portion can be compensated for by pushing the blade outwards of the tool body by means of said screws.

A further important feature of the invention is that the same blade can be used for reaming through bores and dead bores.

As shown in FIGS. 6 and 7 the blade of the reaming tool of this invention is provided with two cutting edges; a longitudinal cutting edge indicated by the line $a1-a2$ in said figures and an end cutting edge indicated by the line $a1-a3$. The blade can be mounted on the tool body in two different positions which are obtained by rotating the blade of 180 deg. about an axis perpendicular to the plane of the blade. When mounted for reaming the inner cylindrical surface of a bore the cutting edge $a1-a3$ at the end of the blade is in the position of FIG. 6 that is towards the tang 2 of the tool; when mounted for reaming the bottom of a dead bore the cutting edge $a1-a3$ is in the position of FIG. 7 that is it is directed toward the workpiece and engages the surface to be reamed which is perpendicular to the tool axis.

When the blade is mounted in this position the longitudinal cutting edge is in its innermost position with respect to the tool body while the side of the blade opposite to the cutting edge fills the gap on the surface of the tool body created by the slot; this side of the blade is rounded off in a way that it comes flush with the outer surface of the tool body as shown in FIG. 9. In this way the cylindrical surface of the bore to be reamed is not spoiled by the blade when the latter is in a position for reaming the bottom of the bore.

The tool at its front section has a lightening 13 in the form of a concavity with rounded profile. Furthermore, the tool is provided at the front face with a removable adapter (see FIGS. 2 and 5) the use of which is for fitting the tool between the two centers of a lathe.

What I claim is:

1. In a tool for widening and precision finishing through bores and dead bores, means for firmly mounting and for removing the working blade which means comprises a cylindrical tool body having a first longitudinal bore coaxial therewith and a second longitudinal bore parallel to the first bore, the cylindrical surfaces of the two bores intersecting each other across a small arc of their circumferences whereby they communicate with each other through a narrow passage extending for the whole of their length; a longitudinally elongated prismatic slot provided in the tool body which slot communicates along one side thereof with said second bore and at the opposite side with the outside of the tool body; the axes of the first and second bore lying substantially on the median plane of the slot whereby the tool body cross-section is almost divided in two portions except for a small section between the inner circumference of the second bore and the outer circumference of the tool body; the working blade of the tool being inserted between the two parallel surfaces of the slot which surfaces due to the presence of said first and second bores in the tool body can be resiliently moved one towards the other under the action of a force acting across the tool body; the working blade of the tool being clamped between said surfaces of the slot by means of screws transverse to the tool body of which screws the head engages one of said portions of the body and the threaded shank engages a threading in the other portion.

2. In a tool as per claim 1, a means for radially adjusting the position of the blade which means comprises screws of which the longitudinal axes lie on planes perpendicular to the tool axis and substantially on the median plane of said slot which screws are introduced into the tool body from the side of it opposite to the slot and their ends abut against the inner side of the blade whereby actuating said screws the blade is moved along the slot towards and away from the tool axis and the depth of cut of the blade is adjusted.

3. In a tool as per claim 1 a working blade which is provided with two cutting edges; a longitudinal cutting edge along one side of the blade and a front cutting edge at one end of the blade; the latter being mounted in the slot with the front cutting edge projecting from the end of the tool when the bottom of a dead bore is to be reamed and in a reversed position that is after a rotation of 180 deg. about an axis perpendicular to the plane of the blade when the inner surface of a through bore is to be reamed; the side of the blade opposite to the longitudinal cutting edge being rounded off with a circular profile of the same radius as the tool body whereby when reaming the bottom of a dead bore the rounded off side of the blade is flush with the cylindrical surface of the tool body and does not spoil the inner surface of the dead bore.

4. In a tool as per claim 3, two elongated pads made of very hard material such as a metal carbide which pads are mounted into longitudinal grooves at the other surface of the tool body and project from the same for the same distance as the longitudinal cutting edge of the blade; the first pad being located at a little angular distance from the blade at the rear of it with respect to the working movement of the tool and the second one being located at the opposite position of the blade with respect to the tool axis.

5. In a tool as per claim 1, an adapter comprising a block which partially obstructs the centre bore of the tool body which block has a countersunk hole coaxial with the tool body whereby the whole tool can be mounted between the centers of a lathe.

References Cited
UNITED STATES PATENTS 3,286,557  11/1966  Reitzler et al. _____ 77—58 XR FRANCIS S. HUSAR, Primary Examiner U.S. Cl. X.R.

77—58